(12) United States Patent
Lake et al.

(10) Patent No.: US 8,287,677 B2
(45) Date of Patent: *Oct. 16, 2012

(54) PRINTABLE ELASTIC COMPOSITE

(75) Inventors: Matthew B. Lake, Cumming, GA (US); James R. Fitts, Jr., Gainesville, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1290 days.

This patent is subject to a terminal disclaimer.

(21) Appl. No.: 12/023,447

(22) Filed: Jan. 31, 2008

(65) Prior Publication Data

US 2009/0197041 A1 Aug. 6, 2009

(51) Int. Cl.
*B32B 37/00* (2006.01)
(52) U.S. Cl. ........ 156/163; 156/164; 156/229; 156/252; 156/277; 156/308.2; 156/309.6
(58) Field of Classification Search .................. 156/229, 156/160, 163, 164, 252, 308.2, 309.9, 277
See application file for complete search history.

(56) References Cited

U.S. PATENT DOCUMENTS

| | | |
|---|---|---|
| 3,338,992 A | 8/1967 | Kinney |
| 3,341,394 A | 9/1967 | Kinney |
| 3,354,506 A | 11/1967 | Raley |
| 3,494,821 A | 2/1970 | Evans |
| 3,502,538 A | 3/1970 | Petersen |
| 3,502,763 A | 3/1970 | Hartmann |
| 3,542,615 A | 11/1970 | Dobo et al. |
| 3,650,649 A | 3/1972 | Schippers |
| 3,692,618 A | 9/1972 | Dorschner et al. |
| 3,801,429 A | 4/1974 | Schrenk et al. |

(Continued)

FOREIGN PATENT DOCUMENTS

WO   WO 9516425 A1   6/1995
(Continued)

OTHER PUBLICATIONS

Russell, S.J. "Handbook of Nonwovens," The Textile Institute: Cambridge, 2003: Chapter 6, 11 pages.

(Continued)

*Primary Examiner* — Jeff Aftergut
(74) *Attorney, Agent, or Firm* — Dority & Manning, P.A.

(57) ABSTRACT

A composite that contains an elastic film laminated to a meltblown facing is provided. During lamination, apertures and discrete bond sites may be concurrently formed in the elastic film. The discrete bond sites may be located proximate (adjacent or near to) a perimeter defined by corresponding apertures formed by displacement of the film. The location of the bond sites adjacent to or near the apertures may enhance the durability of the meltblown facing by strengthening the area surrounding the apertures. Furthermore, the content of the elastic film and the temperature/pressure of lamination may be selected to that the film possesses a sufficient tack for adhering to the facing at regions other than those fused together by the bonding elements of the patterned roll. Such secondary bonding further stabilizes the meltblown facing and renders it suitable for printing. Further, the film is under tension in the machine direction during lamination. Subsequent to lamination, however, the film is retracted so that the facing retracts toward its original machine direction length, thereby gathering and forming pleats. It has been discovered that these pleats have a relatively small amplitude (height), as well as a substantially uniform frequency across the surface of the facing. Such a small height and increased regularity improves the ability to transfer an ink to "peaks" of the pleats, thereby improving print quality and uniformity.

19 Claims, 8 Drawing Sheets

U.S. PATENT DOCUMENTS

| | | | |
|---|---|---|---|
| 3,802,817 A | 4/1974 | Matsuki et al. | |
| 3,844,869 A | 10/1974 | Rust, Jr. | |
| 3,849,241 A | 11/1974 | Butin et al. | |
| 3,855,046 A | 12/1974 | Hansen et al. | |
| 3,939,033 A | 2/1976 | Grgach et al. | |
| 3,985,599 A | 10/1976 | Lepoutre et al. | |
| 4,041,203 A | 8/1977 | Brock et al. | |
| 4,100,324 A | 7/1978 | Anderson et al. | |
| 4,144,370 A | 3/1979 | Boulton | |
| 4,259,399 A | 3/1981 | Hill | |
| 4,323,534 A | 4/1982 | DesMarais | |
| 4,340,563 A | 7/1982 | Appel et al. | |
| 4,374,888 A | 2/1983 | Bornslaeger | |
| 4,663,220 A | 5/1987 | Wisneski et al. | |
| 4,704,116 A | 11/1987 | Enloe | |
| 4,704,238 A | 11/1987 | Okuyama et al. | |
| 4,720,415 A | 1/1988 | Vander Wielen et al. | |
| 4,726,976 A * | 2/1988 | Karami et al. | 428/137 |
| 4,766,029 A | 8/1988 | Brock et al. | |
| 4,781,966 A | 11/1988 | Taylor | |
| 4,789,592 A | 12/1988 | Taniguchi et al. | |
| 4,795,668 A | 1/1989 | Krueger et al. | |
| 4,834,738 A | 5/1989 | Kielpikowski et al. | |
| 4,886,512 A | 12/1989 | Damico et al. | |
| 4,937,299 A | 6/1990 | Ewen et al. | |
| 4,965,122 A | 10/1990 | Morman | |
| 4,981,747 A | 1/1991 | Morman | |
| 4,981,750 A | 1/1991 | Murphy et al. | |
| 5,043,036 A | 8/1991 | Swenson | |
| 5,057,368 A | 10/1991 | Largman et al. | |
| 5,069,970 A | 12/1991 | Largman et al. | |
| 5,093,422 A | 3/1992 | Himes | |
| 5,096,532 A | 3/1992 | Neuwirth et al. | |
| 5,108,820 A | 4/1992 | Kaneko et al. | |
| 5,110,403 A | 5/1992 | Ehlert | |
| 5,162,074 A | 11/1992 | Hills | |
| 5,169,706 A | 12/1992 | Collier, IV et al. | |
| 5,192,606 A | 3/1993 | Proxmire et al. | |
| 5,207,962 A | 5/1993 | Hovis et al. | |
| 5,213,881 A | 5/1993 | Timmons et al. | |
| 5,218,071 A | 6/1993 | Tsutsui et al. | |
| 5,226,992 A | 7/1993 | Morman | |
| 5,272,236 A | 12/1993 | Lai et al. | |
| 5,277,976 A | 1/1994 | Hogle et al. | |
| 5,278,272 A | 1/1994 | Lai et al. | |
| 5,284,703 A | 2/1994 | Everhart et al. | |
| 5,304,599 A | 4/1994 | Himes | |
| 5,322,728 A | 6/1994 | Davey et al. | |
| 5,332,613 A | 7/1994 | Taylor et al. | |
| 5,336,545 A | 8/1994 | Morman | |
| 5,336,552 A | 8/1994 | Strack et al. | |
| 5,350,624 A | 9/1994 | Georger et al. | |
| 5,382,400 A | 1/1995 | Pike et al. | |
| 5,399,219 A | 3/1995 | Roessler et al. | |
| 5,464,688 A | 11/1995 | Timmons et al. | |
| 5,466,410 A | 11/1995 | Hills | |
| 5,472,775 A | 12/1995 | Obijeski et al. | |
| 5,486,166 A | 1/1996 | Bishop et al. | |
| 5,490,846 A | 2/1996 | Ellis et al. | |
| 5,539,056 A | 7/1996 | Yang et al. | |
| 5,540,796 A | 7/1996 | Fries | |
| 5,558,659 A | 9/1996 | Sherrod et al. | |
| 5,560,793 A | 10/1996 | Ruscher et al. | |
| 5,567,501 A | 10/1996 | Srinivasan et al. | |
| D375,844 S | 11/1996 | Edwards et al. | |
| 5,571,619 A | 11/1996 | McAlpin et al. | |
| 5,573,719 A | 11/1996 | Fitting | |
| 5,595,618 A | 1/1997 | Fries et al. | |
| 5,596,052 A | 1/1997 | Resconi et al. | |
| 5,612,118 A * | 3/1997 | Schleinz et al. | 428/195.1 |
| 5,620,779 A | 4/1997 | Levy et al. | |
| 5,649,916 A | 7/1997 | DiPalma et al. | |
| 5,656,119 A | 8/1997 | Srinivasan et al. | |
| 5,674,211 A | 10/1997 | Ekdahl | |
| 5,681,380 A | 10/1997 | Nohr et al. | |
| 5,695,855 A * | 12/1997 | Yeo et al. | 428/196 |
| 5,702,377 A | 12/1997 | Collier, IV et al. | |
| D390,708 S | 2/1998 | Brown | |
| 5,714,107 A | 2/1998 | Levy et al. | |
| 5,733,628 A | 3/1998 | Pelkie | |
| 5,817,199 A | 10/1998 | Brennecke et al. | |
| 5,830,555 A | 11/1998 | Srinivasan et al. | |
| 5,851,935 A | 12/1998 | Srinivasan et al. | |
| 5,931,823 A | 8/1999 | Stokes et al. | |
| 5,932,497 A | 8/1999 | Morman et al. | |
| 5,952,251 A | 9/1999 | Jackson et al. | |
| 5,962,112 A | 10/1999 | Haynes et al. | |
| 5,964,742 A | 10/1999 | McCormack et al. | |
| 5,997,981 A | 12/1999 | McCormack et al. | |
| 6,015,764 A * | 1/2000 | McCormack et al. | 442/370 |
| 6,025,049 A | 2/2000 | Ouellette et al. | |
| 6,025,050 A | 2/2000 | Srinivasan et al. | |
| 6,060,638 A | 5/2000 | Paul et al. | |
| D428,267 S | 7/2000 | Romano, III et al. | |
| 6,090,325 A | 7/2000 | Wheat et al. | |
| 6,093,665 A | 7/2000 | Sayovitz et al. | |
| 6,106,925 A * | 8/2000 | Palumbo | 428/137 |
| 6,110,158 A | 8/2000 | Kielpikowski | |
| 6,111,163 A | 8/2000 | McCormack et al. | |
| 6,150,002 A | 11/2000 | Varona | |
| 6,200,669 B1 | 3/2001 | Marmon et al. | |
| 6,231,948 B1 | 5/2001 | Ouellette et al. | |
| 6,303,208 B1 | 10/2001 | Pelkie | |
| 6,315,864 B2 | 11/2001 | Anderson et al. | |
| 6,461,457 B1 | 10/2002 | Taylor et al. | |
| 6,461,716 B1 | 10/2002 | Lee et al. | |
| 6,500,563 B1 | 12/2002 | Datta et al. | |
| 6,503,598 B1 | 1/2003 | Goda et al. | |
| 6,511,465 B1 | 1/2003 | Freiburger et al. | |
| 6,537,930 B1 | 3/2003 | Middlesworth et al. | |
| 6,542,379 B1 | 4/2003 | Lauffer et al. | |
| 6,663,611 B2 | 12/2003 | Blaney et al. | |
| 6,720,279 B2 | 4/2004 | Cree et al. | |
| 6,737,114 B2 | 5/2004 | Dawson, Jr. et al. | |
| 6,808,789 B2 | 10/2004 | Pelkie et al. | |
| 6,830,800 B2 | 12/2004 | Curro et al. | |
| 6,849,319 B2 | 2/2005 | Cree et al. | |
| 6,884,494 B1 | 4/2005 | Curro et al. | |
| 6,888,044 B2 | 5/2005 | Fell et al. | |
| 6,986,932 B2 | 1/2006 | Zink et al. | |
| 7,008,496 B2 | 3/2006 | Morman | |
| 7,037,569 B2 | 5/2006 | Curro et al. | |
| 7,087,287 B2 | 8/2006 | Curro et al. | |
| 7,141,132 B2 | 11/2006 | Shimakawa et al. | |
| 7,208,217 B2 | 4/2007 | Deep et al. | |
| 7,803,244 B2 * | 9/2010 | Siqueira et al. | 156/229 |
| 2002/0034912 A1 | 3/2002 | Curro et al. | |
| 2003/0028165 A1 | 2/2003 | Curro et al. | |
| 2003/0068951 A1 | 4/2003 | Boggs et al. | |
| 2004/0060112 A1 | 4/2004 | Fell et al. | |
| 2004/0102750 A1 | 5/2004 | Jameson | |
| 2004/0110442 A1 | 6/2004 | Rhim et al. | |
| 2004/0121687 A1 | 6/2004 | Morman et al. | |
| 2004/0122396 A1 | 6/2004 | Maldaonado et al. | |
| 2004/0175556 A1 | 9/2004 | Clark et al. | |
| 2005/0054255 A1 | 3/2005 | Morman et al. | |
| 2005/0059941 A1 | 3/2005 | Baldwin et al. | |
| 2005/0095943 A1 | 5/2005 | Griffin et al. | |
| 2005/0158513 A1 | 7/2005 | Peacock et al. | |
| 2005/0245162 A1 | 11/2005 | McCormack et al. | |
| 2006/0047259 A1 * | 3/2006 | Erdman et al. | 604/389 |
| 2006/0148358 A1 | 7/2006 | Hall et al. | |
| 2006/0151914 A1 | 7/2006 | Gerndt et al. | |
| 2007/0141941 A1 | 6/2007 | DeLucia et al. | |
| 2008/0132872 A1 * | 6/2008 | Trennepohl et al. | 604/385.24 |

FOREIGN PATENT DOCUMENTS

| | | |
|---|---|---|
| WO | WO 9533390 A1 | 12/1995 |
| WO | WO 9829504 A1 | 7/1998 |
| WO | WO 9914047 A1 | 3/1999 |
| WO | WO 0059522 A1 | 9/2000 |
| WO | WO 0145616 A1 | 6/2001 |
| WO | WO 0187592 A1 | 11/2001 |
| WO | WO 2004060664 A1 | 7/2004 |
| WO | WO 2004060666 A1 | 7/2004 |
| WO | WO 2004060669 A1 | 7/2004 |

| WO | WO 2005/102237 A1 | * | 11/2005 |
| WO | WO 2006024394 A1 | | 3/2006 |
| WO | WO 2006071306 A1 | | 7/2006 |

OTHER PUBLICATIONS

ASTM 1505-03—Density of Plastics by the Density-Gradient Technique, 2003.

ASTM 1525-07—Vicat Softening Temperature of Plastics, 2007.

ASTM D3418-03—Transition Temperatures and Enthalpies of Fusion and Crystallization of Polymers by Differential Scanning Calorimetry, 2003.

Abstract of Japanese Patent No. JP2007084954 dated Apr. 5, 2007.

Search Report and Written Opinion for PCT/IB2009/050026 dated Jun. 26, 2009, 14 pages.

* cited by examiner

PRINTABLE ELASTIC COMPOSITE

BACKGROUND OF THE INVENTION

Elastic composites are commonly incorporated into products (e.g., diapers, training pants, garments, etc.) to improve their ability to better fit the contours of the body. For example, the elastic composite may be formed from an elastic film and a nonwoven facing. The nonwoven facing may be joined to the elastic film while the film is in a stretched condition so that the nonwoven facing can gather and form "pleats" between the locations where it is bonded to the film when it is retracted. The resulting elastic composite is stretchable to the extent that the pleats allow the elastic film to elongate. Although imparting elasticity to the composite, such pleats are often irregular in frequency and amplitude. When attempting to print onto such an irregular surface, ink transfer may occur at both the "peaks" and "valleys" of the pleats, which reduces the surface area available for printing and thus reduces print quality. While the small fiber size of meltblown facings can allow for some improvement in print quality, such facings normally possess insufficient durability for use in printing applications.

As such, a need currently exists for an elastic composite that is sufficiently durable and that has a surface suitable for printing.

SUMMARY OF THE INVENTION

In accordance with one embodiment of the present invention, a method of forming a printed elastic composite is disclosed. The method comprises passing an elastic film and a meltblown facing through a nip formed by at least two rolls, one of which is a patterned roll. The method further comprises, at the nip, concurrently melt fusing the film to the meltblown facing and forming apertures in the film without substantially softening a polymer of the meltblown facing. The film is under tension at a stretch ratio of about 1.5 or more in the machine direction at the nip. The film is allowed to retract in the machine direction so that the meltblown facing gathers and forms pleats on a surface thereof. Thereafter, an ink is printed onto the surface of the meltblown facing.

In accordance with another embodiment of the present invention, an elastic composite is disclosed that comprises an elastic film positioned adjacent and melt fused to a meltblown facing at a plurality of discrete bond sites. The elastic film defines a plurality of apertures having a perimeter about which the discrete bond sites are proximately located. The meltblown facing further has a surface that contains a plurality of pleats, wherein at least one of the pleats has an amplitude of from about 0.05 to about 1.0 millimeter.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
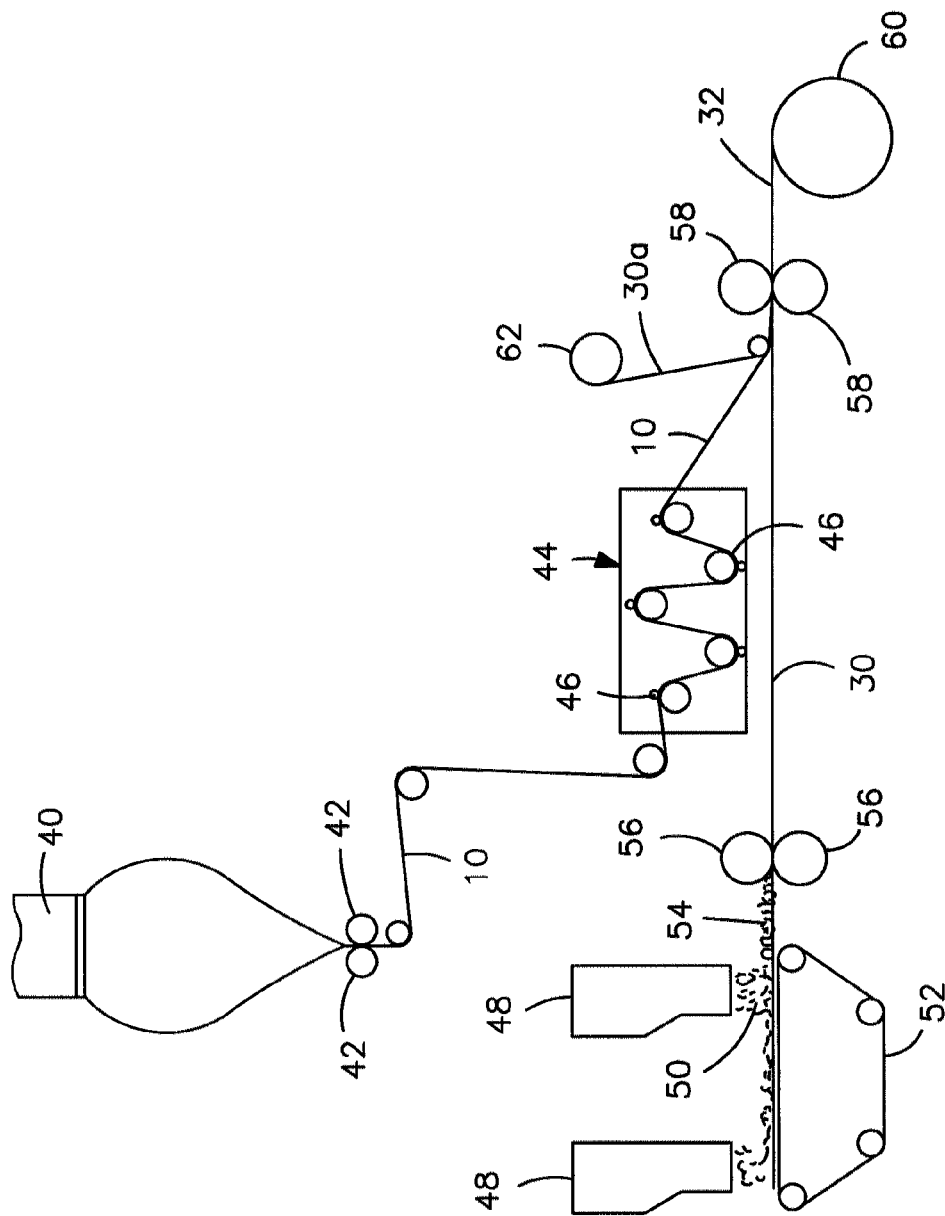
FIG. 1 schematically illustrates a method for forming an elastic composite according to one embodiment of the present invention.

Repeat use of reference characters in the present specification and drawings is intended to represent same or analogous features or elements of the invention.

DETAILED DESCRIPTION OF REPRESENTATIVE EMBODIMENTS

Definitions

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Levy, 3,542,615 to Dobo, et al., and 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

As used herein, the terms "machine direction" or "MD" generally refers to the direction in which a material is produced. The term "cross-machine direction" or "CD" refers to the direction perpendicular to the machine direction.

As used herein the terms "extensible" or "extensibility" generally refers to a material that stretches or extends in the direction of an applied force by at least about 25%, in some embodiments about 50%, and in some embodiments, at least about 75% of its relaxed length or width. An extensible material does not necessarily have recovery properties. For example, an elastomeric material is an extensible material having recovery properties. A meltblown web may be extensible, but not have recovery properties, and thus, be an extensible, non-elastic material.

As used herein, the term "elastomeric" and "elastic" and refers to a material that, upon application of a stretching force, is stretchable in at least one direction (such as the CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, the material contracts or recovers at least 50%, and even more desirably, at least 80% of the stretched length.

As used herein, the terms "necked" and "necked material" generally refer to any material that has been drawn in at least one dimension (e.g., machine direction) to reduce its transverse dimension (e.g., cross-machine direction) so that when the drawing force is removed, the material may be pulled back to its original width. The necked material generally has a higher basis weight per unit area than the un-necked material. When the necked material is pulled back to its original width, it should have about the same basis weight as the un-necked material. This differs from the orientation of a film in which the film is thinned and the basis weight is reduced. The necking method typically involves unwinding a material from a supply roll and passing it through a brake nip roll assembly driven at a given linear speed. A take-up roll or nip, operating at a linear speed higher than the brake nip roll, draws the material and generates the tension needed to elongate and neck the material.

As used herein, the term "thermal point bonding" generally refers to a process performed, for example, by passing a material between a patterned roll (e.g., calender roll) and another roll (e.g., anvil roll), which may or may not be patterned. One or both of the rolls are typically heated.

As used herein, the term "ultrasonic bonding" generally refers to a process performed, for example, by passing a material between a sonic horn and a patterned roll (e.g., anvil roll). For instance, ultrasonic bonding through the use of a stationary horn and a rotating patterned anvil roll is described in U.S. Pat. Nos. 3,939,033 to Grgach, et al., 3,844,869 to Rust Jr., and 4,259,399 to Hill, which are incorporated herein in their entirety by reference thereto for all purposes. Moreover, ultrasonic bonding through the use of a rotary horn with a rotating patterned anvil roll is described in U.S. Pat. Nos. 5,096,532 to Neuwirth, et al., 5,110,403 to Ehlert, and 5,817, 199 to Brennecke, et al., which are incorporated herein in their entirety by reference thereto for all purposes. Of course, any other ultrasonic bonding technique may also be used in the present invention.

As used herein, the term "breathability" generally refers to the water vapor transmission rate (WVTR) of an area of a material. Breathability is measured in grams of water per square meter per day ($g/m^2/24$ hours). The WVTR of a material may be measured in accordance with ASTM Standard E96-80. Alternatively, for materials having WVTR greater than about 3000 $g/m^2/24$ hours testing systems such as, for example, the PERMATRAN-W 100K water vapor permeation analysis system, commercially available from Modern Controls, Inc. (MOCON) of Minneapolis, Minn., may be used.

DETAILED DESCRIPTION

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

Generally speaking, the present invention is directed to a composite that contains an elastic film laminated to a meltblown facing. Lamination is accomplished via a patterned bonding technique (e.g., thermal point bonding, ultrasonic bonding, etc.) in which the materials are supplied to a nip defined by at least one patterned roll. Through selective control of certain parameters of the lamination process, such as film content, bonding pattern, degree of film tension, bonding conditions, etc., the durability of the meltblown facing may be improved. During lamination, for example, apertures and discrete bond sites may be concurrently formed in the elastic film. The discrete bond sites may be located proximate (adjacent or near to) a perimeter defined by corresponding apertures formed by displacement of the film. The location of the bond sites adjacent to or near the apertures may enhance the durability of the meltblown facing by strengthening the area surrounding the apertures. Furthermore, the polymer content of the elastic film and the temperature/pressure of lamination may be selected so that the film possesses a sufficient tack for adhering to the facing at regions other than those fused together by the bonding elements of the patterned roll. Such secondary bonding further stabilizes the meltblown facing and renders it suitable for printing.

Other aspects of the lamination technique of the present invention may also help provide a surface of the meltblown facing that is suitable for printing. For example, the film is under tension in the machine direction during lamination. Subsequent to lamination, however, the film is retracted so that the facing retracts toward its original machine direction length, thereby gathering and forming pleats. When formed according to the present invention, it has been discovered that these pleats have a relatively small amplitude (height), as well as a substantially uniform frequency across the surface of the facing. Such a small height and increased regularity improves the ability to transfer an ink to the "peaks" of the pleats, thereby improving the print quality and uniformity.

In this regard, various embodiments of the present invention will now be described in more detail.

I. Elastic Film

The elastic film of the present invention is formed from one or more elastomeric polymers that are melt-processable, i.e., thermoplastic. Any of a variety of thermoplastic elastomeric polymers may generally be employed in the present invention, such as elastomeric polyesters, elastomeric polyurethanes, elastomeric polyamides, elastomeric copolymers, elastomeric polyolefins, and so forth. In one particular embodiment, elastomeric semi-crystalline polyolefins are employed due to their unique combination of mechanical and elastomeric properties. That is, the mechanical properties of such semi-crystalline polyolefins allows for the formation of films that readily aperture during thermal bonding, but yet retain their elasticity.

Semi-crystalline polyolefins have or are capable of exhibiting a substantially regular structure. For example, semi-crystalline polyolefins may be substantially amorphous in their undeformed state, but form crystalline domains upon stretching. The degree of crystallinity of the olefin polymer may be from about 3% to about 30%, in some embodiments from about 5% to about 25%, and in some embodiments, from about 5% and about 15%. Likewise, the semi-crystalline polyolefin may have a latent heat of fusion ($\Delta H_f$), which is another indicator of the degree of crystallinity, of from about 15 to about 75 Joules per gram ("J/g"), in some embodiments from about 20 to about 65 J/g, and in some embodiments, from 25 to about 50 J/g. The semi-crystalline polyolefin may also have a Vicat softening temperature of from about 10° C. to about 100° C., in some embodiments from about 20° C. to about 80° C., and in some embodiments, from about 30° C. to about 60° C. The semi-crystalline polyolefin may have a melting temperature of from about 20° C. to about 120° C., in some embodiments from about 35° C. to about 90° C., and in some embodiments, from about 40° C. to about 80° C. The latent heat of fusion ($\Delta H_f$) and melting temperature may be determined using differential scanning calorimetry ("DSC") in accordance with ASTM D-3417 as is well known to those skilled in the art. The Vicat softening temperature may be determined in accordance with ASTM D-1525.

Exemplary semi-crystalline polyolefins include polyethylene, polypropylene, blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from 0.85 to 0.96 grams per cubic centimeter ("g/cm³"). Polyethylene "plastomers", for instance, may have a density in the range of from 0.85 to 0.91 g/cm³. Likewise, "linear low density polyethylene" ("LLDPE") may have a density in the range of from 0.91 to 0.940 g/cm³; "low density polyethylene" ("LDPE") may have a density in the range of from 0.910 to 0.940 g/cm³; and "high density polyethylene" ("HDPE") may have density in the range of from 0.940 to 0.960 g/cm³. Densities may be measured in accordance with ASTM 1505.

Particularly suitable polyethylene copolymers are those that are "linear" or "substantially linear." The term "substantially linear" means that, in addition to the short chain branches attributable to comonomer incorporation, the ethylene polymer also contains long chain branches in that the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/α-olefin copolymer is a function of both the length and amount of the α-olefin. That is, the greater the length of the α-olefin and the greater the amount of α-olefin present, the lower the density of the copolymer. Although not necessarily required, linear polyethylene "plastomers" are particularly desirable in that the content of α-olefin short chain branching content is such that the ethylene copolymer exhibits both plastic and elastomeric characteristics—i.e., a "plastomer." Because polymerization with α-olefin comonomers decreases crystallinity and density, the resulting plastomer normally has a density lower than that of polyethylene thermoplastic polymers (e.g., LLDPE), but approaching and/or overlapping that of an elastomer. For example, the density of the polyethylene plastomer may be 0.91 grams per cubic centimeter (g/cm³) or less, in some embodiments, from 0.85 to 0.88 g/cm³, and in some embodiments, from 0.85 g/cm³ to 0.87 g/cm³. Despite having a density similar to elastomers, plastomers generally exhibit a higher degree of crystallinity, are relatively non-tacky, and may be formed into pellets that are non-adhesive and relatively free flowing.

The distribution of the α-olefin comonomer within a polyethylene plastomer is typically random and uniform among the differing molecular weight fractions forming the ethylene copolymer. This uniformity of comonomer distribution within the plastomer may be expressed as a comonomer distribution breadth index value ("CDBI") of 60 or more, in some embodiments 80 or more, and in some embodiments, 90 or more. Further, the polyethylene plastomer may be characterized by a DSC melting point curve that exhibits the occurrence of a single melting point peak occurring in the region of 50 to 110° C. (second melt rundown).

Preferred plastomers for use in the present invention are ethylene-based copolymer plastomers available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. Nos. 4,937,299 to Ewen et al.; 5,218,071 to Tsutsui et al.; 5,272,236 to Lai, et al.; and 5,278,272 to Lai, et al., which are incorporated herein in their entirety by reference thereto for all purposes.

Of course, the present invention is by no means limited to the use of ethylene polymers. For instance, propylene polymers may also be suitable for use as a semi-crystalline polyolefin. Suitable plastomeric propylene polymers may include, for instance, copolymers or terpolymers of propylene include copolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. Preferably, the density of the polypropylene (e.g., propylene/α-olefin copolymer) may be 0.91 grams per cubic centimeter (g/cm$^3$) or less, in some embodiments, from 0.85 to 0.88 g/cm$^3$, and in some embodiments, from 0.85 g/cm$^3$ to 0.87 g/cm$^3$. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the semi-crystalline polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. Nos. 5,571,619 to McAlpin et al.; 5,322,728 to Davis et al.; 5,472,775 to Obijeski et al.; 5,272,236 to Lai et al.; and 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

The melt flow index (MI) of the semi-crystalline polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

Of course, other thermoplastic polymers may also be used to form the elastic film, either alone or in conjunction with the semi-crystalline polyolefins. For instance, a substantially amorphous block copolymer may be employed that has at least two blocks of a monoalkenyl arene polymer separated by at least one block of a saturated conjugated diene polymer. The monoalkenyl arene blocks may include styrene and its analogues and homologues, such as o-methyl styrene; p-methyl styrene; p-tert-butyl styrene; 1,3 dimethyl styrene p-methyl styrene; etc., as well as other monoalkenyl polycyclic aromatic compounds, such as vinyl naphthalene; vinyl anthrycene; and so forth. Preferred monoalkenyl arenes are styrene and p-methyl styrene. The conjugated diene blocks may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth.

The amount of monoalkenyl arene (e.g., polystyrene) blocks may vary, but typically constitute from about 8 wt. % to about 55 wt. %, in some embodiments from about 10 wt. % to about 35 wt. %, and in some embodiments, from about 25 wt. % to about 35 wt. % of the copolymer. Suitable block copolymers may contain monoalkenyl arene endblocks having a number average molecular weight from about 5,000 to about 35,000 and saturated conjugated diene midblocks having a number average molecular weight from about 20,000 to about 170,000. The total number average molecular weight of the block polymer may be from about 30,000 to about 250,000.

Particularly suitable thermoplastic elastomeric copolymers are available from Kraton Polymers LLC of Houston, Tex. under the trade name KRATON®. KRATON® polymers include styrene-diene block copolymers, such as styrene-butadiene, styrene-isoprene, styrene-butadiene-styrene, and styrene-isoprene-styrene. KRATON® polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. These block copolymers may have a linear, radial or star-shaped molecular configuration. Specific KRATON® block copolymers include those sold under the brand names G 1652, G 1657, G 1730, MD6673, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S elastomeric copolymers available from Kuraray Company, Ltd. of Okayama, Japan, under the trade designation SEPTON®. Still other suitable copolymers include the S-I-S and S-B-S elastomeric copolymers available from Dexco Polymers of Houston, Tex. under the trade designation VECTOR®. Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

The amount of elastomeric polymer(s) employed in the film may vary, but is typically about 30 wt. % or more of the film, in some embodiments about 50 wt. % or more, and in some embodiments, about 80 wt. % or more of the of the film. In one embodiment, for example, the semi-crystalline polyolefin(s) constitute about 70 wt. % or more of the film, in some embodiments about 80 wt. % or more of the film, and in some embodiments, about 90 wt. % or more of the film. In other embodiments, blends of semi-crystalline polyolefin(s) and elastomeric block copolymer(s) may be employed. In such embodiments, the block copolymer(s) may constitute from about 5 wt. % to about 50 wt. %, in some embodiments from about 10 wt. % to about 40 wt. %, and in some embodiments, from about 15 wt. % to about 35 wt. % of the blend. Likewise, the semi-crystalline polyolefin(s) may constitute from about 50 wt. % to about 95 wt. %, in some embodiments from about 60 wt. % to about 90 wt. %, and in some embodiments, from about 65 wt. % to about 85 wt. % of the blend. It should of course be understood that other elastomeric and/or non-elastomeric polymers may also be employed in the film.

Besides polymers, the elastic film of the present invention may also contain other components as is known in the art. In one embodiment, for example, the elastic film contains a filler. Fillers are particulates or other forms of material that may be added to the film polymer extrusion blend and that will not chemically interfere with the extruded film, but which may be uniformly dispersed throughout the film. Fillers may serve a variety of purposes, including enhancing film opacity and/or breathability (i.e., vapor-permeable and substantially liquid-impermeable). For instance, filled films may be made breathable by stretching, which causes the polymer to break away from the filler and create microporous passageways. Breathable microporous elastic films are described, for example, in U.S. Pat. Nos. 5,997,981; 6,015,764; and 6,111,163 to McCormack, et al.; 5,932,497 to Morman, et al.; 6,461,457 to Taylor, et al., which are incorporated herein in their entirety by reference thereto for all purposes.

The fillers may have a spherical or non-spherical shape with average particle sizes in the range of from about 0.1 to about 7 microns. Examples of suitable fillers include, but are not limited to, calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives. A suitable coating, such as stearic acid, may also be applied to the filler particles if desired. When utilized, the filler content may vary, such as from about 25 wt. % to about 75 wt. %, in some embodiments, from about 30 wt. % to about 70 wt. %, and in some embodiments, from about 40 wt. % to about 60 wt. % of the film.

Other additives may also be incorporated into the film, such as melt stabilizers, processing stabilizers, heat stabilizers, light stabilizers, antioxidants, heat aging stabilizers, whitening agents, antiblocking agents, bonding agents, tackifiers, viscosity modifiers, etc. Examples of suitable tackifier resins may include, for instance, hydrogenated hydrocarbon resins. REGALREZ™ hydrocarbon resins are examples of such hydrogenated hydrocarbon resins, and are available from Eastman Chemical. Other tackifiers are available from ExxonMobil under the ESCOREZ™ designation. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals of under the trade name "Irganox®", such as Irganox® 1076, 1010, or E 201. Moreover, bonding agents may also be added to the film to facilitate bonding of the film to additional materials (e.g., nonwoven web). When employed, such additives (e.g., tackifier, antioxidant, stabilizer, etc.) may each be present in an amount from about 0.001 wt. % to about 25 wt. %, in some embodiments, from about 0.005 wt. % to about 20 wt. %, and in some embodiments, from 0.01 wt. % to about 15 wt. % of the film.

The elastic film of the present invention may be mono- or multi-layered. Multilayer films may be prepared by co-extrusion of the layers, extrusion coating, or by any conventional layering process. Such multilayer films normally contain at least one base layer and at least one skin layer, but may contain any number of layers desired. For example, the multilayer film may be formed from a base layer and one or more skin layers, wherein the base layer is formed from a semi-crystalline polyolefin. In such embodiments, the skin layer(s) may be formed from any film-forming polymer. If desired, the skin layer(s) may contain a softer, lower melting polymer or polymer blend that renders the layer(s) more suitable as heat seal bonding layers for thermally bonding the film to a nonwoven web. For example, the skin layer(s) may be formed from an olefin polymer or blends thereof, such as described above. Additional film-forming polymers that may be suitable for use with the present invention, alone or in combination with other polymers, include ethylene vinyl acetate, ethylene ethyl acrylate, ethylene acrylic acid, ethylene methyl acrylate, ethylene normal butyl acrylate, nylon, ethylene vinyl alcohol, polystyrene, polyurethane, and so forth.

The thickness of the skin layer(s) is generally selected so as not to substantially impair the elastomeric properties of the film. To this end, each skin layer may separately comprise from about 0.5% to about 15% of the total thickness of the film, and in some embodiments from about 1% to about 10% of the total thickness of the film. For instance, each skin layer may have a thickness of from about 0.1 to about 10 micrometers, in some embodiments from about 0.5 to about 5 micrometers, and in some embodiments, from about 1 to about 2.5 micrometers. Likewise, the base layer may have a thickness of from about 1 to about 40 micrometers, in some embodiments from about 2 to about 25 micrometers, and in some embodiments, from about 5 to about 20 micrometers.

The properties of the resulting film may generally vary as desired. For instance, prior to stretching, the film typically has a basis weight of about 100 grams per square meter or less, and in some embodiments, from about 50 to about 75 grams per square meter. Upon stretching, the film typically has a basis weight of about 60 grams per square meter or less, and in some embodiments, from about 15 to about 35 grams per square meter. The stretched film may also have a total thickness of from about 1 to about 100 micrometers, in some embodiments, from about 10 to about 80 micrometers, and in some embodiments, from about 20 to about 60 micrometers.

II. Meltblown Facing

Generally speaking, the facing used in the composite contains a meltblown web to improve the receptiveness of the facing to an ink. Namely, meltblown webs generally have small pores that allow the ink to exhibit better surface retention upon printing. The small pore size may also provide other benefits, such as inhibiting the passage of liquids and particles, while allowing gases (e.g., air and water vapor) to pass therethrough. To achieve the desired pore size, the meltblown fibers are typically "microfibers" in that they have an average size of about 10 micrometers or less, in some embodiments from about 0.01 to about 7 micrometers, and in some embodiments, from about 0.1 to about 5 micrometers.

The meltblown web is typically formed from a polymer having a softening temperature that is higher than the temperature imparted during bonding. In this manner, the polymer does typically not soften to such an extent that the fibers of the meltblown web become completely melt flowable and unable to form bonds. For instance, polymers may be employed that have a Vicat softening temperature (ASTM D-1525) of from about 100° C. to about 300° C., in some embodiments from about 120° C. to about 250° C., and in some embodiments, from about 130° C. to about 200° C. Exemplary high-softening point polymers for use in forming meltblown facings may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, biodegradable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the meltblown web. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Various methods for forming multicomponent fibers are described in U.S. Pat. No. 4,789,592 to Taniguchi et al. and U.S. Pat. Nos. 5,336,552 to Strack et al., 5,108,820 to Kaneko, et al., 4,795,668 to Kruege, et al., 5,382,400 to Pike, et al., 5,336,552 to Strack, et al., and 6,200,669 to Marmon, et al., which are incorporated herein in their entirety by reference thereto for all purposes. Multicomponent fibers having various irregular shapes may also be formed, such as described in U.S. Pat. Nos. 5,277,976 to Hogle, et al., 5,162,074 to Hills, 5,466,410 to Hills, 5,069,970 to Largman, et al., and 5,057,368 to Largman, et al., which are incorporated herein in their entirety by reference thereto for all purposes.

The desired denier of the fibers may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3.

Although not required, the meltblown web may optionally be bonded using any conventional technique, such as with an adhesive or autogenously (e.g., fusion and/or self-adhesion of the fibers without an applied external adhesive). Suitable autogenous bonding techniques may include ultrasonic bonding, thermal bonding, through-air bonding, calender bonding, and so forth. As is well known to those skilled in the art, the temperature and pressure required may vary depending upon many factors including but not limited to, pattern bond area, polymer properties, fiber properties and nonwoven properties. The meltblown web may also be necked in one or more directions prior to lamination to the film of the present invention. Suitable techniques necking techniques are described in U.S. Pat. Nos. 5,336,545, 5,226,992, 4,981,747 and 4,965,122 to Morman, as well as U.S. Patent Application Publication No. 2004/0121687 to Morman, et al. Alternatively, the meltblown web may remain relatively inextensible in at least one direction prior to lamination to the film. In such embodiments, the meltblown web may be optionally stretched in one or more directions subsequent to lamination to the film.

If desired, the meltblown facing may have a multi-layer structure. Suitable multi-layered facings may include, for instance, spunbond/meltblown/spunbond (SMS) laminates and spunbond/meltblown (SM) laminates. Various examples of suitable SMS laminates are described in U.S. Pat. Nos. 4,041,203 to Brock et al.; 5,213,881 to Timmons, et al.; 5,464,688 to Timmons, et al.; 4,374,888 to Bornslaeger; 5,169,706 to Collier, et al.; and 4,766,029 to Brock et al., which are incorporated herein in their entirety by reference thereto for all purposes. In addition, commercially available SMS laminates may be obtained from Kimberly-Clark Corporation under the designations Spunguard® and Evolution®.

The meltblown facing may also contain an additional fibrous component such that it is considered a composite. For example, a meltblown web may be entangled with another fibrous component using any of a variety of entanglement techniques known in the art (e.g., hydraulic, air, mechanical, etc.). In one particular embodiment, the facing may be a "coform web" made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. Nos. 4,100,324 to Anderson, et al.; 5,284,703 to Everhart, et al.; and 5,350,624 to Georger, et al.; which are incorporated herein in their entirety by reference thereto for all purposes.

Regardless of its particular construction, one particular benefit of the present invention is that the meltblown facing may have a relatively low basis weight and yet remain durable and still present a suitable surface for printing. For example, the basis weight may range from about 1 to about 70 grams per square meter, in some embodiments from about 2 to about 40 grams per square meter, and in some embodiments, from about 4 to about 12 grams per square meter. Such a low basis weight may provide a variety of benefits, including reduced costs and improved flexibility.

III. Other Facings

In addition to an elastic film and meltblown facing, the composite of the present invention may also include other facings as is known in the art. For example, the composite may include an additional nonwoven facing, such as a meltblown web, spunbond web, bonded carded web, wet-laid web, airlaid web, coform web, hydraulically entangled web, etc. The additional facing(s) may be multi-layered and/or a composite material, such as described above.

IV. Lamination Technique

Lamination is accomplished via a patterned bonding technique (e.g., thermal point bonding, ultrasonic bonding, etc.) in which the materials are supplied to a nip defined by at least one patterned roll. Thermal point bonding, for instance, typically employs a nip formed between two rolls, at least one of which is patterned. Ultrasonic bonding, on the other hand, typically employs a nip formed between a sonic horn and a patterned roll. Regardless of the technique chosen, the patterned roll contains a plurality of raised bonding elements to bond the film to the meltblown facing.

As indicated above, the durability and stability of the meltblown facing is enhanced by the concurrent formation of apertures and discrete bond sites during lamination. Such apertures may also provide a desired level of texture, softness, hand feel, and/or aesthetic appeal to the composite without having a significant adverse effect on its elastic properties. Aperture and bond formation are accomplished in the present invention by selectively controlling certain parameters of the lamination process, such as film content, bonding pattern, degree of film tension, bonding conditions, etc. The size of the bonding elements, for example, may be specifically tailored to facilitate the formation of apertures in the film and enhance bonding between the film and the meltblown facing. For example, the bonding elements are typically selected to have a relatively large length dimension. The length dimension of the bonding elements may be from about 300 to about 5000 micrometers, in some embodiments from about 500 to about 4000 micrometers, and in some embodiments, from about 1000 to about 2000 micrometers. The width dimension of the bonding elements may likewise range from about 20 to about 500 micrometers, in some embodiments from about 40 to about 200 micrometers, and in some embodiments, from about 50 to about 150 micrometers. In addition, the "element aspect ratio" (the ratio of the length of an element to its width) may range from about 2 to about 100, in some embodiments from about 4 to about 50, and in some embodiments, from about 5 to about 20.

Besides the size of the bonding elements, the overall bonding pattern may also be selectively controlled to achieve the desired aperture formation. In one embodiment, for example, a bonding pattern is selected in which the longitudinal axis (longest dimension along a center line of the element) of one or more of the bonding elements is skewed relative to the machine direction ("MD") of the elastic film. For example, one or more of the bonding elements may be oriented from about 30° to about 150°, in some embodiments from about 45° to about 135°, and in some embodiments, from about 60° to about 120° relative to the machine direction of the film. In this manner, the bonding elements will present a relatively large surface to the film in a direction substantially perpendicular to that which the film moves. This increases the area over which shear stress is imparted to the film and, in turn, facilitates aperture formation.

The pattern of the bonding elements is generally selected so that the nonwoven composite has a total bond area of less than about 50% (as determined by conventional optical microscopic methods), and in some embodiments, less than about 30%. The bond density is also typically greater than about 50 bonds per square inch, and in some embodiments, from about 75 to about 500 pin bonds per square inch. One suitable bonding pattern for use in the present invention is known as an "S-weave" pattern and is described in U.S. Pat. No. 5,964,742 to McCormack, et al., which is incorporated herein in its entirety by reference thereto for all purposes. S-weave patterns typically have a bonding element density of from about 50 to about 500 bonding elements per square inch, and in some embodiments, from about 75 to about 150 bonding elements per square inch. Another suitable bonding pattern is known as the "rib-knit" pattern and is described in U.S. Pat. No. 5,620,779 to Levy, et al., which is incorporated herein in its entirety by reference thereto for all purposes. Rib-knit patterns typically have a bonding element density of from about 150 to about 400 bonding elements per square inch, and in some embodiments from about 200 to about 300 bonding elements per square inch. Yet another suitable pattern is the "wire weave" pattern, which has a bonding element density of from about 200 to about 500 bonding elements per square inch, and in some embodiments, from about 250 to about 350 bonding elements per square inch. Other bond patterns that may be used in the present invention are described in U.S. Pat. Nos. 3,855,046 to Hansen et al.; 5,962,112 to Haynes et al.; 6,093,665 to Sayovitz et al.; D375,844 to Edwards, et al.; D428,267 to Romano et al.; and D390,708 to Brown, which are incorporated herein in their entirety by reference thereto for all purposes.

The selection of an appropriate bonding temperature (e.g., the temperature of a heated roll) will help melt and/soften the low-softening point elastomeric polymer(s) of the film at regions adjacent to the bonding elements. The softened elastomeric polymer(s) may then flow and become displaced during bonding, such as by pressure exerted by the bonding elements. The displaced portions of the film surrounding the apertures can also fuse to the meltblown facing, thereby forming an integral nonwoven composite. Furthermore, because the elastomeric polymer(s) may physically entrap or adhere to the fibers at the bond sites, adequate bond formation may be achieved without requiring substantial softening of the polymer(s) used to form the meltblown facing. Thus, the meltblown facing remains substantially unbonded to the film or other materials at those regions located directly adjacent to (e.g. above or below) the apertures. Further, the meltblown facing is also generally unapertured, although it may of course develop some small cuts or tears during processing.

To achieve such concurrent aperture and bond formation without substantially softening the polymer(s) of the meltblown facing, the bonding temperature and pressure may be selectively controlled. For example, one or more rolls may be heated to a surface temperature of from about 50° C. to about 160° C., in some embodiments from about 60° C. to about 140° C., and in some embodiments, from about 70° C. to about 120° C. Likewise, the pressure exerted by rolls ("nip pressure") during thermal bonding may range from about 75 to about 600 pounds per linear inch, in some embodiments from about 100 to about 400 pounds per linear inch, and in some embodiments, from about 120 to about 200 pounds per linear inch. Of course, the residence time of the materials may influence the particular bonding parameters employed.

Another factor that influences concurrent aperture and bond formation is the degree of tension in the film during lamination. An increase in film tension, for example, typically correlates to an increase in aperture size. Of course, a film tension that is too high may adversely affect the integrity of the film. Thus, in most embodiments of the present invention, a stretch ratio of about 1.5 or more, in some embodiments from about 2.5 to about 7.0, and in some embodiments, from about 3.0 to about 5.5, is employed to achieve the desired degree of tension in the film during lamination. The stretch ratio may be determined by dividing the final length of the film by its original length. The stretch ratio may also be approximately the same as the draw ratio, which may be determined by dividing the linear speed of the film during lamination (e.g., speed of the nip rolls) by the linear speed at which the film is formed (e.g., speed of casting rolls or blown nip rolls).

The film may be "pre-stretched" (prior to lamination) by rolls rotating at different speeds of rotation so that the sheet is stretched to the desired stretch ratio in the machine direction. This uniaxially stretched film may also be oriented in the cross-machine direction to form a "biaxially stretched" film. The orientation temperature profile during the "pre-stretching" operation is generally below the melting point of one or more polymers in the film, but high enough to enable the composition to be drawn or stretched. For example, the film may be stretched at a temperature from about 15° C. to about 50° C., in some embodiments from about 25° C. to about 40° C., and in some embodiments, from about 30° C. to about 40° C. When "pre-stretched" in the manner described above, the degree of stretch during lamination may be increased, maintained, or slightly reduced (retracted) to desired degree of tension.

Upon lamination, the elastic film is bonded to the meltblown facing and apertured. The size and/or pattern of the resulting apertures generally correspond to the size and/or pattern of the bonding elements. That is, the apertures may have a length, width, aspect ratio, and orientation as described above. For example, the length dimension of the apertures may be from about 200 to about 5000 micrometers, in some embodiments from about 350 to about 4000 micrometers, and in some embodiments, from about 500 to about 2500 micrometers. The width dimension of the apertures may likewise range from about 20 to about 500 micrometers, in some embodiments from about 40 to about 200 micrometers, and in some embodiments, from about 50 to about 150 micrometers. In addition, the "aspect ratio" (the ratio of the length of an aperture to its width) may range from about 2 to about 100, in some embodiments from about 4 to about 50, and in some embodiments, from about 5 to about 20. Similarly, the longitudinal axis of one or more of the apertures (longest dimension along a center line of the aperture) may be skewed relative to the machine direction of the elastic film, such as from about 300 to about 150°, in some embodiments from about 45° to about 135°, and in some embodiments, from about 60° to about 120° relative to the machine direction of the film.

Various embodiments of the present invention will now be described in greater detail. Of course, it should be understood that the description provided below is merely exemplary, and that other methods are contemplated by the present invention. Referring to FIG. 1, for instance, one embodiment of a method for forming a composite from an elastic film and a meltblown facing is shown. As shown, the raw materials of the film (e.g., elastomeric polymer) may be dry mixed together (i.e., without a solvent) and added to a hopper (not shown) of an extrusion apparatus 40. The raw materials may alternatively be blended with a solvent. In the hopper, the materials are dispersively mixed in the melt and compounded using any known technique, such as batch and/or continuous compounding techniques that employ, for example, a Banbury mixer, Farrel continuous mixer, single screw extruder, twin screw extruder, etc.

Any known technique may be used to form a film from the compounded material, including blowing, casting, flat die extruding, etc. In one particular embodiment, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. Nos. 3,354,506 to Raley; 3,650,649 to Schippers; and 3,801,429 to Schrenk et al., as well as U.S. Patent Application Publication Nos. 2005/0245162 to McCormack, et al. and 2003/0068951 to Boggs, et al., all of which are incorporated herein in their entirety by reference thereto for all purposes. For example, in the particular embodiment of FIG. 1, the compounded material (not shown) is supplied to the extrusion apparatus 40 and then blown into nip rolls 42 to form a single-layered precursor elastic film 10. The rolls 42 may be kept at temperature sufficient to solidify and quench the precursor elastic film 10 as it is formed, such as from about 20 to 60° C. Typically, the resulting precursor elastic film is generally unapertured, although it may of course possess small cuts or tears as a result of processing. The use of an initially unapertured film can provide a variety of benefits, including the avoidance of registration steps needed to align the apertures with bond sites during lamination.

Referring again to FIG. 1, one method for forming a uniaxially stretched film is shown. In the illustrated embodiment, the film 10 is stretched and thinned in the machine direction by passing it through a film-orientation unit or machine direction orienter ("MDO") 44, such as commercially available from Marshall and Willams, Co. of Providence, R.I. In the illustrated embodiment, the MDO has a plurality of stretching rolls 46 that progressively stretch and thin the film 10 in the machine direction. While four pairs of rolls 46 are illustrated in FIG. 1, it should be understood that the number of rolls may be higher or lower, depending on the level of stretch that is desired and the degrees of stretching between each roll. The film 10 may be stretched in either single or multiple discrete stretching operations. The film 10 may also be stretched in other directions. For example, the film may be clamped at its lateral edges by chain clips and conveyed into a tenter oven. In the tenter oven, the film may be drawn in the cross-machine direction to the desired stretch ratio by chain clips diverged in their forward travel.

A meltblown facing is also employed for laminating to the elastic film 10. For example, the meltblown facing may simply be unwound from a supply roll. Alternatively, as shown in FIG. 1, a meltblown facing 30 may be formed in-line, such as by meltblown dies 48. The dies 48 deposit fibers 50 onto a forming wire 52, which is part of a continuous belt arrangement that circulates around a series of rolls. If desired, a vacuum (not shown) may be utilized to maintain the fibers on the forming wire 52. The meltblown fibers 50 form a mat 54 that may optionally be compressed via compaction rolls 56. Although not necessarily required, a second facing 30a originating from a supply roll 62 may also be laminated to the elastic film 10. The second facing 30a may be a meltblown facing, as well as another type of nonwoven web material, film, foam, etc.

Figure 2:
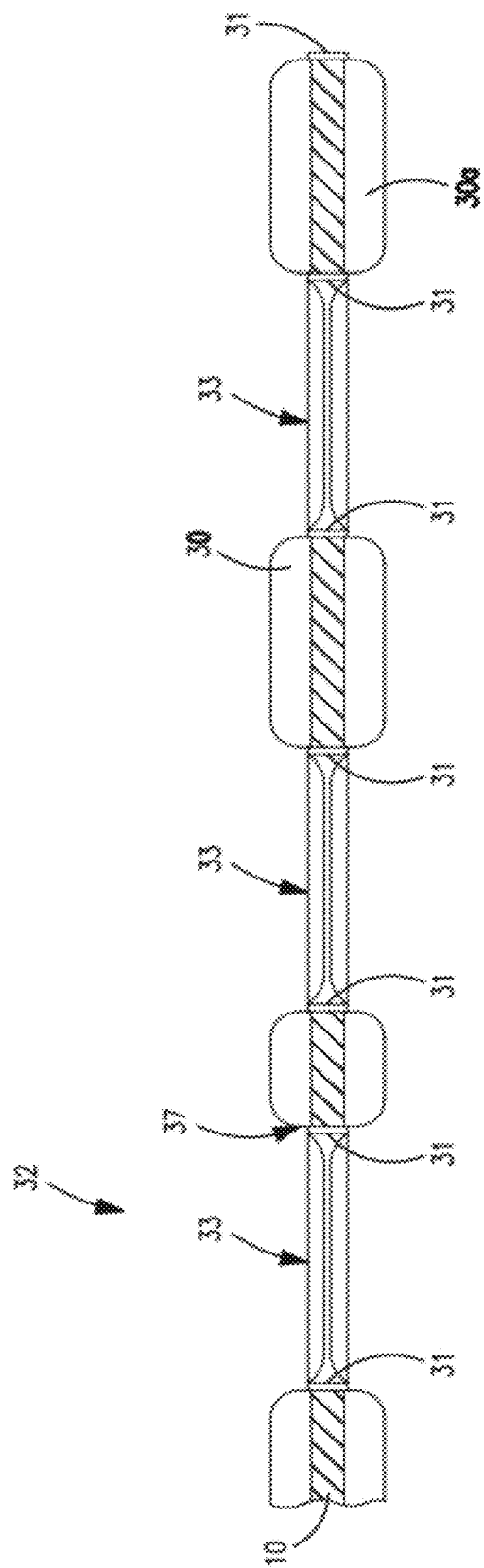
FIG. 2 is cross-sectional view of one embodiment of a meltblown facing and elastic subsequent to lamination.

Regardless, thermal bonding techniques are employed to laminate the facing(s) to the elastic film. In FIG. 1, for instance, the facings 30 and 30a are directed to a nip defined between rolls 58 for laminating to the elastic film 10. One or both of the rolls 58 may contain a plurality of raised bonding elements and/or may be heated. Upon lamination, the elastic film 10 is melt fused to the facings 30 and 30a at a plurality of discrete bond sites 31. (See FIG. 2). That is, the elastomeric polymer(s) of the film 10 are softened and/or melted so that they may physically entrap fibers of the materials 30 and 30a. Of course, the elastic film 10 may possess a certain tack so that it also adheres to the fibers upon lamination. As shown in FIG. 2, the bond sites 31 may be located proximate (adjacent or near to) a perimeter 37 defined by corresponding apertures 33, which are formed by displacement of the film 10. The particular location of the bond sites 31 adjacent to or near the apertures 33 may enhance the integrity of the resulting composite 32 by strengthening the area surrounding the apertures 33. Because thermal bonding occurs at a temperature that is insufficient to substantially soften the polymer(s) of the facings 30 and 30a, as described above, they are not substantially melt fused to each other. In this manner, the composite 32 may better retain the physical properties (e.g., liquid permeability, softness, bulk, and hand feel) of the meltblown facing.

While not shown in FIG. 1, various additional potential processing and/or finishing steps known in the art, such as slitting, stretching, etc., may be performed without departing from the spirit and scope of the invention. For instance, the composite may optionally be mechanically stretched in the cross-machine and/or machine directions to enhance extensibility. In one embodiment, the composite may be coursed through two or more rolls that have grooves in the CD and/or MD directions. Such grooved satellite/anvil roll arrangements are described in U.S. Patent Application Publication Nos. 2004/0110442 to Rhim, et al. and 2006/0151914 to Gerndt, et al., which are incorporated herein in their entirety by reference thereto for all purposes. For instance, the laminate may be coursed through two or more rolls that have grooves in the CD and/or MD directions. The grooved rolls may be constructed of steel or other hard material (such as a hard rubber). In one embodiment, for example, the composite may be stretched in one or more directions at a stretch ratio of from about 1.5 to about 8.0, in some embodiments by at least about 2.0 to about 6.0, and in some embodiments, from about 2.5 to about 4.5. If desired, heat may be applied to the composite just prior to or during the application of incremental stretch to cause it to relax somewhat and ease extension. Heat may be applied by any suitable method known in the art, such as heated air, infrared heaters, heated nipped rolls, or partial wrapping of the laminate around one or more heated rolls or steam canisters, etc. Heat may also be applied to the grooved rolls themselves. It should also be understood that other grooved roll arrangement are equally suitable, such as two grooved rolls positioned immediately adjacent to one another. Besides the above-described grooved rolls, other techniques may also be used to mechanically stretch the composite in one or more directions. For example, the composite may be passed through a tenter frame that stretches the composite. Such tenter frames are well known in the art and described, for instance, in U.S. Patent Application Publication No. 2004/0121687 to Morman, et al. The composite may also be necked. Suitable techniques necking techniques are described in U.S. Pat. Nos. 5,336,545, 5,226,992, 4,981,747 and 4,965,122 to Morman, as well as U.S. Patent Application Publication No. 2004/0121687 to Morman, et al., all of which are incorporated herein in their entirety by reference thereto for all purposes.

Referring again to FIG. 1, the composite 32, upon formation, may then be wound and stored on a take-up roll 60. Generally, the composite 32 is allowed to retract in the machine direction prior to and/or during winding on to the take-up roll 60. This may be achieved by using a slower linear velocity for the roll 60. Alternatively, the composite 32 may be wound onto the roll 60 under tension and subsequently allowed to retract prior to use. Regardless, the elastic film 10 will retract toward its original machine direction length and become shorter in the machine direction, thereby forming "pleats" in the meltblown facing. The resulting elastic composite thus becomes extensible in the machine direction to the extent that the pleats in the facing may be pulled back out flat, thereby allowing the elastic film 10 to elongate.

Figure 3:
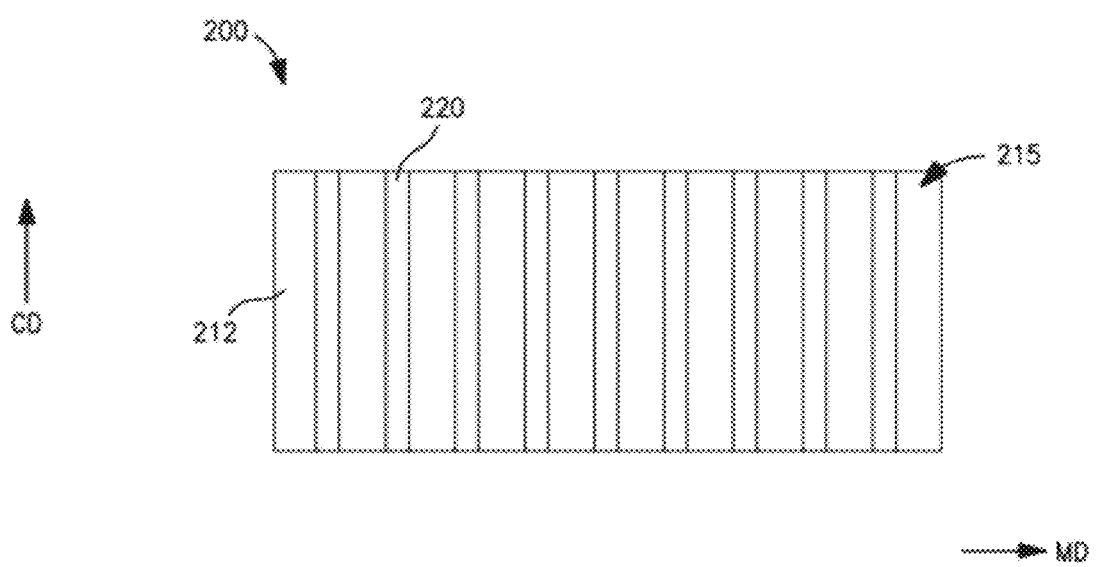
FIG. 3 is a top view of a portion of one embodiment of the elastic composite of the present invention.
Figure 4:
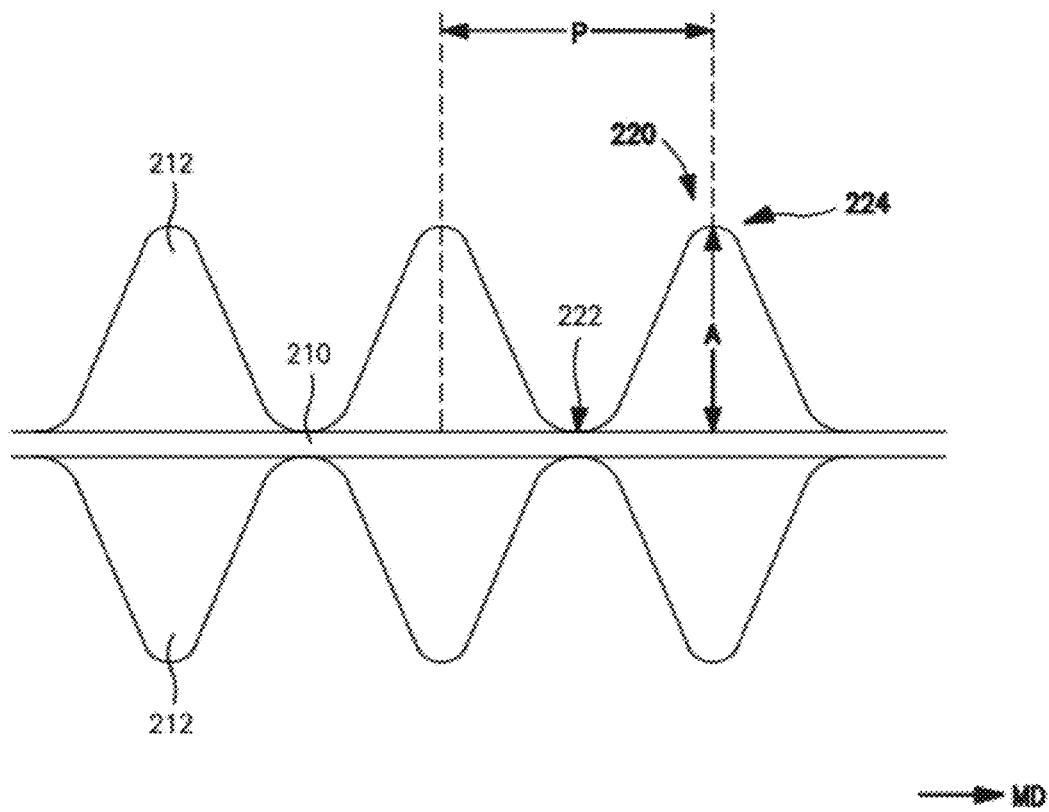
FIG. 4 is an exploded, cross-sectional view of the elastic composite of FIG. 3.

Generally speaking, the resulting "pleats" in the meltblown facing have a relatively small amplitude (height) and wavelength ("peak-to-peak" distance), thereby rending the surface more suitable for printing. Referring to FIGS. 3-4, for example, an elastic composite 200 is shown that includes a film 210 positioned between two meltblown facings 212. As shown in FIG. 3, at least one of the facings 212 possesses a surface 215 having a plurality of pleats 220 (only a portion of which are illustrated) that traverses substantially across the surface of the facing 212 in the cross-machine direction ("CD"). Further, as best illustrated in FIG. 4, each of the pleats 220 has valleys 222 and peaks 224. The amplitude of the pleats 220, which is the distance from the valley to the peak of a pleat (represented as "A" in FIG. 4), is relatively small, such as from about 0.05 to about 1.0 millimeters, in some embodiments from about 0.8 to about 0.7 millimeters, in some embodiments from about 0.1 to about 0.5 millimeters, and in some embodiments, from about 0.25 to about 0.45 millimeters. Further, the wavelength of the pleats 220, which is the distance from the peak of one pleat to the peak of another pleat (represented as "P" in FIG. 4), is also relatively small, such as from about 0.2 to about 1.0 millimeters, in some embodiments from about 0.3 to about 0.8 millimeters, and in some embodiments, from about 0.4 to about 0.7 millimeters. It is believed that pleats having a small height and wavelength (high density) can improve print quality by providing a larger effective surface area for transfer of the ink.

V. Printing Techniques

Any printing technique may be employed to apply an ink to the pleated surface of the meltblown facing, such as gravure printing, flexographic printing, screen printing, ink-jet printing, laser printing, thermal ribbon printing, piston printing, etc. In one particular embodiment, ink-jet printing techniques are employed to apply an ink to the meltblown facing. Ink-jet printing is a non-contact printing technique that involves forcing an ink through a tiny nozzle (or a series of nozzles) to form droplets that are directed toward the support. Two techniques are generally utilized, i.e., "DOD" (Drop-On-Demand) or "continuous" ink-jet printing. In continuous systems, ink is emitted in a continuous stream under pressure through at least one orifice or nozzle. The stream is perturbed by a pressurization actuator to break the stream into droplets at a fixed distance from the orifice. DOD systems, on the other hand, use a pressurization actuator at each orifice to break the ink into droplets. The pressurization actuator in each system may be a piezoelectric crystal, an acoustic device, a thermal device, etc. The selection of the type of ink jet system varies on the type of material to be printed from the print head. For example, conductive materials are sometimes required for continuous systems because the droplets are deflected electrostatically.

The particular type or style of ink pattern is not a limiting factor of the invention, and may include, for example, any arrangement of stripes, bands, dots, or other geometric shape. The pattern may include indicia (e.g., trademarks, text, and logos), floral designs, abstract designs, any configuration of artwork, etc. The pattern may be targeted for a specific class of consumers. For example, in the case of diapers or training pants, the pattern may be in the form of cartoon characters, and so forth. It should be appreciated that the "pattern" may take on virtually any desired appearance. Nevertheless, the ink usually covers from about 25% to 100% of the surface area of the meltblown facing, in some embodiments from about 30% to about 90% of the surface area of the facing, and in some embodiments, from about 30% to about 50% of the surface area of the facing.

The ink generally includes one or more colorants (e.g., pigments, dyes, etc.) that impart a certain color to the facing, such as black, white, yellow, cyan, magenta, red, green, blue, etc. For example, the colorant may be an inorganic and/or organic pigment. Some examples of commercially available organic pigments that may be used in the present invention include those that are available from Clariant Corp. of Charlotte, N.C., under the trade designations GRAPHTOL® or CARTAREN®. Other pigments, such as lake compounds (blue lake, red lake, yellow lake, etc.), may also be employed. Inorganic and/or organic dyes may also be utilized as a colorant. Exemplary organic dye classes include triarylmethyl dyes, monoazo dyes, thiazine dyes, oxazine dyes, naphthalimide dyes, azine dyes, cyanine dyes, indigo dyes, coumarin dyes, benzimidazole dyes, paraquinoidal dyes, fluorescein dyes, diazonium salt dyes, azoic diazo dyes, phenylenediamine dyes, diazo dyes, anthraquinone dyes, trisazo dyes, xanthene dyes, proflavine dyes, sulfonaphthalein dyes, phthalocyanine dyes, carotenoid dyes, carminic acid dyes, azure dyes, acridine dyes, and so forth. One particularly suitable class of dyes includes anthraquinone compounds, which may be classified for identification by their Color Index (CI) number. For instance, some suitable anthraquinones that may be used in the present invention, as classified by their "CI" number, include Acid Black 48, Acid Blue 25 (D&C Green No. 5), Acid Blue 40, Acid Blue 41, Acid Blue 45, Acid Blue 129, Acid Green 25, Acid Green 27, Acid Green 41, Mordant Red 11 (Alizarin), Mordant Black 13 (Alizarin Blue Black B), Mordant Red 3 (Alizarin Red S), Mordant Violet 5 (Alizarin Violet 3R), Natural Red 4 (Carminic Acid), Disperse Blue 1, Disperse Blue 3, Disperse Blue 14, Natural Red 16 (Purpurin), Natural Red 8, Reactive Blue 2, and so forth.

Prior to application, the colorant is typically dissolved or dispersed in a solvent to form the ink. Any solvent capable of dispersing or dissolving the components is suitable, for example water; alcohols such as ethanol or methanol; dimethylformamide; dimethyl sulfoxide; hydrocarbons such as pentane, butane, heptane, hexane, toluene and xylene; ethers such as diethyl ether and tetrahydrofuran; ketones and aldehydes such as acetone and methyl ethyl ketone; acids such as acetic acid and formic acid; and halogenated solvents such as dichloromethane and carbon tetrachloride; as well as mixtures thereof. The concentration of solvent in the ink formulation is generally high enough to allow easy application, handling, etc. Although the actual concentration of solvent employed will generally depend on the type of ink and the facing on which it is applied, it is nonetheless typically present in an amount from about 40 wt. % to about 99 wt. %, in some embodiments from about 50 wt. % to about 95 wt. %, and in some embodiments, from about 60 wt. % to about 90 wt. % of the ink (prior to drying). The colorant may likewise constitute from about 0.01 to about 20 wt. %, in some embodiments from about 0.01 wt. % to about 10 wt. %, in some embodiments, from about 0.05 wt. % to about 5 wt. %, and in some embodiments from about 0.1 wt. % to about 3 wt. % of the ink (prior to drying).

The ink may also include various other components as is well known in the art, such as colorant stabilizers, photoinitiators, binders, solvents, surfactants, humectants, biocides or biostats, electrolytic salts, pH adjusters, etc. For example, examples of such humectants include, but are not limited to, ethylene glycol; diethylene glycol; glycerine; polyethylene glycol 200, 400, and 600; propane 1,3 diol; propylene-glycolmonomethyl ethers, such as Dowanol PM (Gallade Chemical Inc., Santa Ana, Calif.); polyhydric alcohols; or combinations thereof. Other additives may also be included to improve ink performance, such as a chelating agent to sequester metal ions that could become involved in chemical reactions over time, a corrosion inhibitor to help protect metal components of the printer or ink delivery system, a biocide or biostat to control unwanted bacterial, fungal, or yeast growth in the ink, and a surfactant to adjust the ink surface tension. Other components for use in an ink are described in U.S. Pat. Nos. 5,681,380 to Nohr, et al. and 6,542,379 to Nohr, et al., which are incorporated herein in their entirety by reference thereto for all purposes.

VI. Articles

The printed nonwoven composite of the present invention may be used in a wide variety of applications. As noted above, for example, the nonwoven composite may be used in an absorbent article. An "absorbent article" generally refers to any article capable of absorbing water or other fluids, including personal care absorbent articles, such as diapers, training pants, absorbent underpants, adult incontinence products, feminine hygiene products (e.g., sanitary napkins), swim wear, baby wipes, and so forth; medical absorbent articles, such as garments, fenestration materials, underpads, bandages, absorbent drapes, and medical wipes; food service wipers; clothing articles; and so forth. Several examples of such absorbent articles are described in U.S. Pat. Nos. 5,649,916 to DiPalma, et al.; 6,110,158 to Kielpikowski; 6,663,611 to Blaney, et al., which are incorporated herein in their entirety by reference thereto for all purposes. Still other suitable articles are described in U.S. Patent Application Publication No. 2004/0060112 A1 to Fell et al., as well as U.S. Pat. Nos. 4,886,512 to Damico et al.; 5,558,659 to Sherrod et al.; 6,888,044 to Fell et al.; and 6,511,465 to Freiburger et al., all of which are incorporated herein in their entirety by reference thereto for all purposes.

Materials and processes suitable for forming such absorbent articles are well known to those skilled in the art. Absorbent articles may include, for example, a substantially liquid-impermeable layer (e.g., outer cover), a liquid-permeable layer (e.g., bodyside liner, surge layer, etc.), and an absorbent core. In one particular embodiment of the present invention, the printed nonwoven composite may be used to form a substantially liquid-impermeable layer (e.g., outer cover) of the absorbent article. Meltblown facings, for instance, may be positioned on each side of the elastic film to provide a barrier to liquids. Such composites may have a breathability (WVTR) of about 300 $g/m^2/24$ hours or more, in some embodiments about 500 $g/m^2/24$ hours or more, and in some embodiments, from about 750 to about 15,000 $g/m^2/24$ hours.

In another embodiment, the printed nonwoven composite of the present invention may be used to form a liquid-permeable layer (e.g., bodyside liner, surge layer) of the absorbent article. As described above, the elastic film is bonded to a facing at discrete bond sites located proximate to the perimeter of the apertures. By selectively controlling the conditions of the lamination process, however, the facing remains substantially unbonded (e.g., not substantially melt fused together) at the regions located adjacent to the apertures. For example, when the elastic film is positioned between two facings, melt bond sites are not generally formed between the facings at those regions adjacent to the apertures. The conditions of the lamination process may also allow the facing(s) to remain generally unapertured at those regions adjacent to the apertures in the elastic film. The existence of such generally unbonded and unapertured regions in the facing(s) enhances the ability of the composite to be employed as a liquid-permeable layer in an absorbent article. Namely, because the facing is not fused together at those regions adjacent to the film apertures, a liquid may more readily flow through the facing and into the aperture. Likewise, the absence of substantial aperturing in the facing allows it to retain other desirable properties (e.g., bulk, softness, handfeel, etc.). The nonwoven composite of the present invention may also have a wide variety of other uses, such as in providing an elastic waist, leg cuff/gasketing, ear, panel, or any other component in which elastic properties are desirable.

The present invention may be better understood with reference to the following example.

Example

The ability to form a printable elastic composite in accordance with the present invention was demonstrated. The film of the composite was a single layer film composed of 98 wt.

% VISTAMAXX™ 1100 and 2 wt. % titanium dioxide concentrate (TiO$_2$ in polyethylene) available from Standridge Color Corp. under the designation "SCC 116921." The film was cast at a speed of 50 ft/min on a primary casting roll, quenched, and transferred to a set of fixed S-wrap rollers operating at a speed of 50 ft/min. The film was then drawn under tension from the S-wrap to a thermal bonding calender stack at a draw ratio of 4.5× (225 ft/min at calender). The tensioned film was combined in the calender stack nip with a meltblown facing (upper side) and a spunbond facing (lower side), both of which were unwound at a speed of 225 ft/min. The spunbond facing had a basis weight of 13.6 gsm and was composed of 98 wt. % polypropylene (STF 315, ExxonMobil) and 2 wt. % TiO$_2$. The meltblown facing had a basis weight of 6.8 gsm and was composed of 98 wt. % polypropylene (3764G, ExxonMobil) and 2 wt. % TiO$_2$ concentrate. The calender stack was heated to a temperature of 240° F. for both the smooth and patterned rolls using a rib-knit bond pattern. The bonding pressure was set to 45 psi (lb/square inch), which corresponds to 130 pounds per linear inch. After lamination, the material was allowed to retract by 51%, unimpeded from the calender to the winder with a winder speed of 115 ft/min.

Each side of the resulting composite was thereafter tested for abrasion resistance. More specifically, six (6) separate circular samples (six-inch diameter) were initially cut from the material. A Martindale abrader was then used to abrade the samples. The samples were divided into two groups of three: one group for meltblown abrasion testing and the other group for spunbond testing. Each of the three samples in each group was subjected to a different number of cycles in the Martindale abrader: 25 cycles, 100 cycles, or 200 cycles in accordance with ASTM-2205. A higher abrasion score was given for samples having a greater degree of abrasion resistance. The resulting abrasion scores are set forth below in Table 1:

TABLE 1

| Abrasion Resistance | | | |
|---|---|---|---|
| | 25 cycles | 100 cycles | 200 cycles |
| Spunbond side | 5 | 4 | 2 |
| Meltblown side | 5 | 5 | 5 |

As indicated, the meltblown side of the composite generally possessed a greater degree of abrasion resistance. Various samples of the material were also photographed using scanning electron microscopy (SEM). The microphotographs are shown in FIGS. 5-8. The microphotographs were analyzed to determine the amplitude and wavelength of the pleats on both sides of the composite. For the amplitude data, FIG. 7 was measured from the peak of the meltblown web to the peak of the spunbond web, while the meltblown and spunbond amplitudes were measured separately for FIGS. 5-6 and 8. The results are set forth below in Tables 2-3 and also shown on the microphotographs.

TABLE 2

Figure 5:
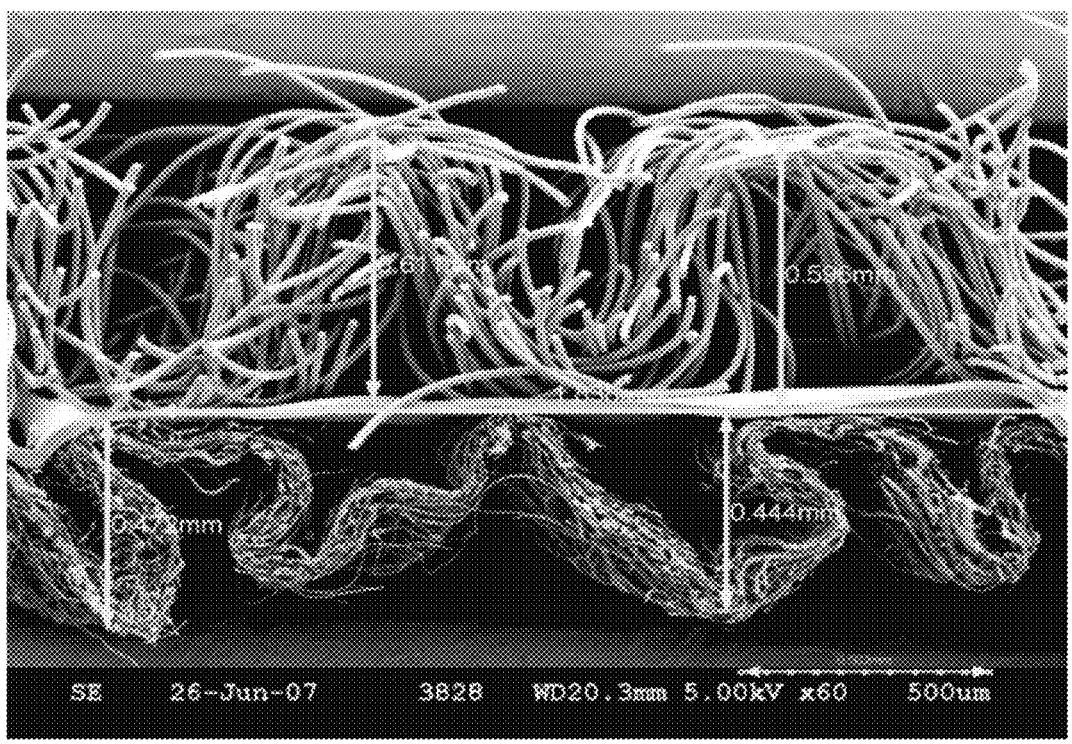
FIGS. 5-8 are SEM microphotographs of cross-sections of samples from the Example (cut at an angle of 45° in the machine direction) viewed in the cross-machine direction or z-axis of the material (where the x axis depicts the material thickness).
Figure 6:
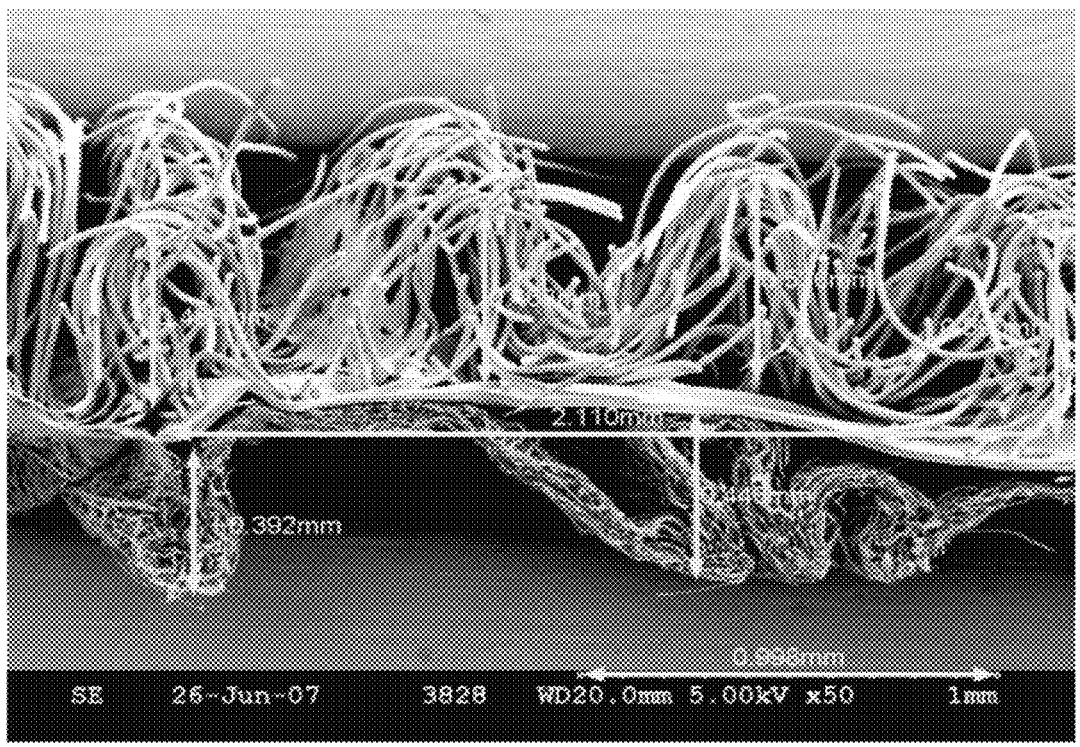
Figure 7:
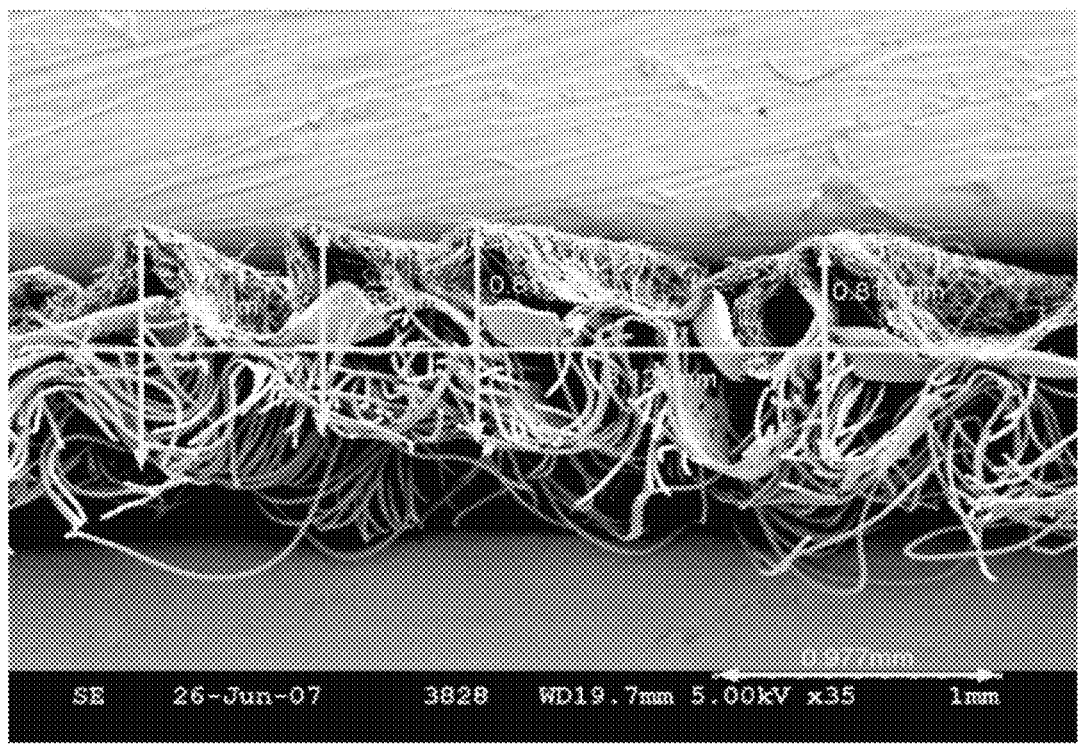

| Wavelength Data | | | | | |
|---|---|---|---|---|---|
| SEM | Horizontal Length (mm) | Corrected Length (mm)* | # Cycles | Frequency (cycles/mm) | Wavelength (mm) |
| FIG. 5 | 1.84 | 1.30 | 2 | 1.54 | 0.65 |
| FIG. 6 | 2.11 | 1.49 | 3 | 2.01 | 0.50 |
| FIG. 7 | 3.12 | 2.21 | 5 | 2.27 | 0.44 |

TABLE 2-continued

Figure 8:
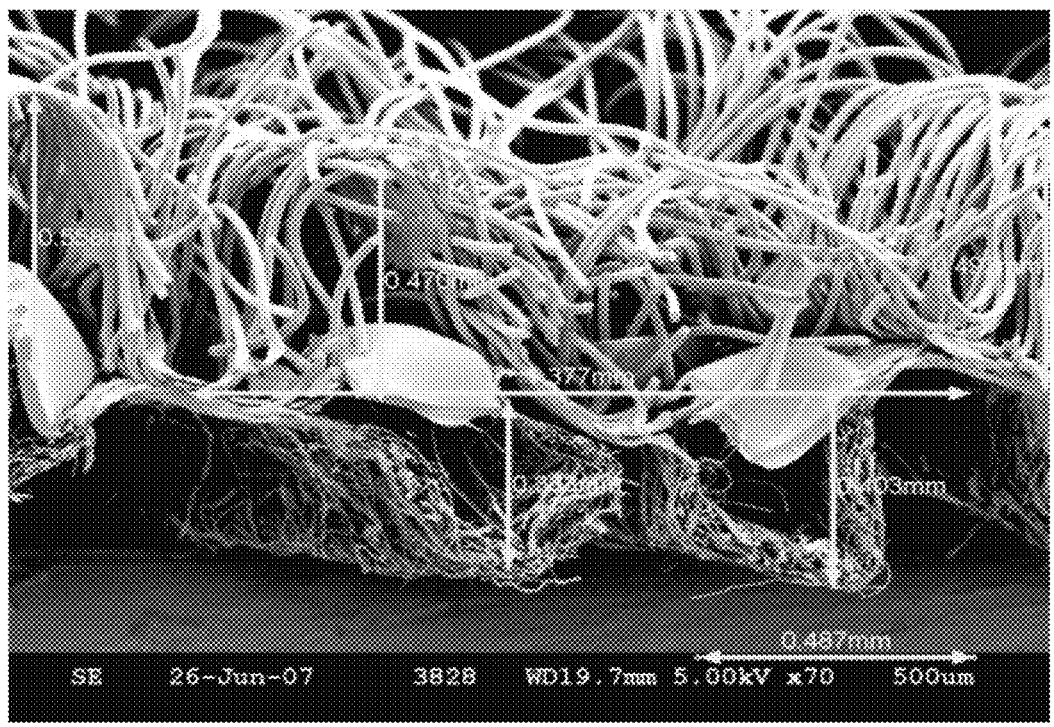

| Wavelength Data | | | | | |
|---|---|---|---|---|---|
| SEM | Horizontal Length (mm) | Corrected Length (mm)* | # Cycles | Frequency (cycles/mm) | Wavelength (mm) |
| FIG. 8 | 1.38 | 0.98 | 2 | 2.05 | 0.49 |
| | | | | 1.97 (avg.) | 0.52 (avg.) |
| | | | | 0.21 (avg. dev.) | 0.07 (avg. dev.) |

*The horizontal length was corrected to account for the 45° cutting angle according to the equation: Corrected length = √[(Horizontal Length)$^2$/2]

TABLE 3

| Amplitude Data | | | |
|---|---|---|---|
| Figure | Meltblown Side (mm) | Spunbond Side (mm) | Both (mm) |
| FIG. 5 | 0.472 | 0.611 | — |
| | 0.444 | 0.596 | |
| FIG. 6 | 0.392 | 0.486 | — |
| | 0.446 | 0.468 | |
| | — | 0.536 | |
| | — | 0.590 | |
| FIG. 7 | — | — | 0.925 |
| | | | 0.783 |
| | | | 0.817 |
| | | | 0.811 |
| FIG. 8 | 0.333 | 0.558 | — |
| | 0.403 | 0.470 | |
| | — | 0.492 | |
| Avg | 0.41 | 0.54 | 0.83 |
| Avg Dev | 0.04 | 0.05 | 0.04 |

FIGS. 5-8 also show that the composite possesses two distinct regions of construction along which the material may be divided along its MD. The first region is best shown in FIGS. 7-8, in which the film appears discontinuous due to the formation of apertures therein. Bonding generally occurs within the first region through contact of the material with the raised regions of the calender roll. The second region is best shown in FIGS. 5-6, in which the film appears to be continuous due to the fact that the photographed portion corresponds to the CD gap between the lanes of calendar bond points in the MD. Bonding generally occurs within the second region through simple adherence of the film to the facing rather than through contact of the material with the raised regions of the calender roll.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of forming a printed elastic composite, the method comprising:
   passing an elastic film and a meltblown facing through a nip formed by at least two rolls, one of which is a patterned roll, wherein the elastic film comprises a polymer composition;
   at the nip, concurrently melt fusing the film to the meltblown facing and forming apertures in the film without substantially softening a polymer of the meltblown facing, wherein the film is under tension at a stretch ratio of about 1.5 or more in the machine direction at the nip;

allowing the film to retract in the machine direction so that the meltblown facing gathers and forms pleats on a surface thereof; and thereafter, printing an ink onto the surface of the meltblown facing, wherein the ink is printed in a pattern that covers from about 25% to about 100% of the surface area of the meltblown facing.

2. The method of claim 1, wherein the polymer composition comprises an elastomeric semi-crystalline polyolefin.

3. The method of claim 2, wherein the semi-crystalline polyolefin is an ethylene/α-olefin copolymer, propylene/α-olefin copolymer, or a combination thereof.

4. The method of claim 1, wherein the stretch ratio is from about 2.5 to about 7.0.

5. The method of claim 1, wherein the elastic film is stretched prior to passing through the nip.

6. The method of claim 1, wherein the roll is patterned with raised bonding elements.

7. The method of claim 6, wherein at least one of the bonding elements is oriented from about 30° to about 150° relative to the machine direction.

8. The method of claim 1, wherein at least one of the rolls is heated to a surface temperature of from about 50° C. to about 160° C.

9. The method of claim 1, wherein the polymer of the meltblown facing is a polyolefin.

10. The method of claim 1, wherein at least one discrete bond site is formed between the film and the meltblown facing that is located proximate to a perimeter defined by at least one of the apertures.

11. The method of claim 1, wherein the meltblown facing is generally unapertured after being melt fused to the film.

12. The method of claim 1, wherein an additional nonwoven facing is passed through the nip so that the elastic film is positioned between the meltblown facing and the additional nonwoven facing.

13. The method of claim 1, further comprising mechanically stretching the composite in at least the cross-machine direction.

14. The method of claim 1, wherein at least one of the pleats has an amplitude of from about 0.05 to about 1.0 millimeter.

15. The method of claim 1, wherein at least one of the pleats has an amplitude of from about 0.1 to about 0.5 millimeter.

16. The method of claim 1, wherein the ink is ink-jet printed onto the surface of the meltblown facing.

17. The method of claim 1, wherein the ink is printed in a pattern that covers about 30% to about 90% of the surface area of the meltblown facing.

18. The method of claim 1, wherein the ink includes a pigment.

19. The method of claim 1, wherein the ink includes a dye.

* * * * *